Figure 3:
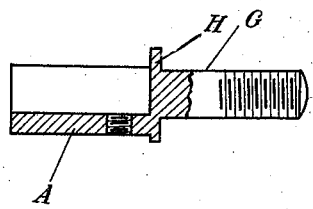

G. H. RANSOM.
WIND SCREEN FOR USE ON CONVEYANCES AND LIKE PURPOSES.
APPLICATION FILED DEC. 29, 1919.

1,342,183. Patented June 1, 1920.

Inventor-
George Hardiman Ransom,
By- B. Singer, Atty.

UNITED STATES PATENT OFFICE.

GEORGE HARDIMAN RANSOM, OF BIRMINGHAM, ENGLAND.

WIND-SCREEN FOR USE ON CONVEYANCES AND LIKE PURPOSES.

1,342,183.　　　　　Specification of Letters Patent.　　Patented June 1, 1920.

Application filed December 29, 1919. Serial No. 348,164.

*To all whom it may concern:*

Be it known that I, GEORGE HARDIMAN RANSOM, a subject of the King of Great Britain, and a resident of Northfield, Birmingham, in the county of Warwick, England, have invented certain new and useful Improvements in or Relating to Wind-Screens for Use on Conveyances and like Purposes, of which the following is a specification.

This invention relates to wind screens for conveyances, and especially to motor vehicle wind screens of the transparent type provided with means whereby they can be moved into any desired angular position and then fixed in such position.

The object of the invention is to provide an improved angularly adjustable wind screen mounting that will be efficient in its action and free from all looseness.

The mechanism whereby the angular position of such wind screens can be varied is usually connected directly to the framework of the sheet of transparent medium forming the wind screen, and it is one of the objects of the present invention to construct this framework in such a manner as to facilitate the insertion therein of the sheet of glass or other transparent medium so that there will be less liability to its breakage during such insertion than heretofore.

According to the present invention the grooved framework of the sheet of transparent medium is constructed of independent members of which the lower one is formed of a tube of crescent shaped cross section, the inner curve of the crescent forming the groove for the lower edge of the sheet of transparent medium. The ends of this tube have rods tightly fitting therein, the portions of the rods within the tubes being of the same section as the bore of the tube while their outer portions are of round section and adapted to pass through holes formed in the sides of the framework thereby forming the pin of a hinge about which the inclination of the screen can be varied. This construction can be used in combination with any suitable means for varying the inclination of the wind screen. It is, however, preferable to use such construction of framework with wind screens having a hinge of the known kind wherein the engaging hinge joint ends of the members fixed to the vehicle and of those forming the side frames of the screen are constructed of interfitting forks having prongs of disk shape perforated to receive the hinge pins and sufficiently thin that by means of nuts screwed to fit the projecting ends of the hinge pins they can be forced into frictional engagement so as to secure the frame in any desired angular position to which it has been moved.

Figures 1, 2:
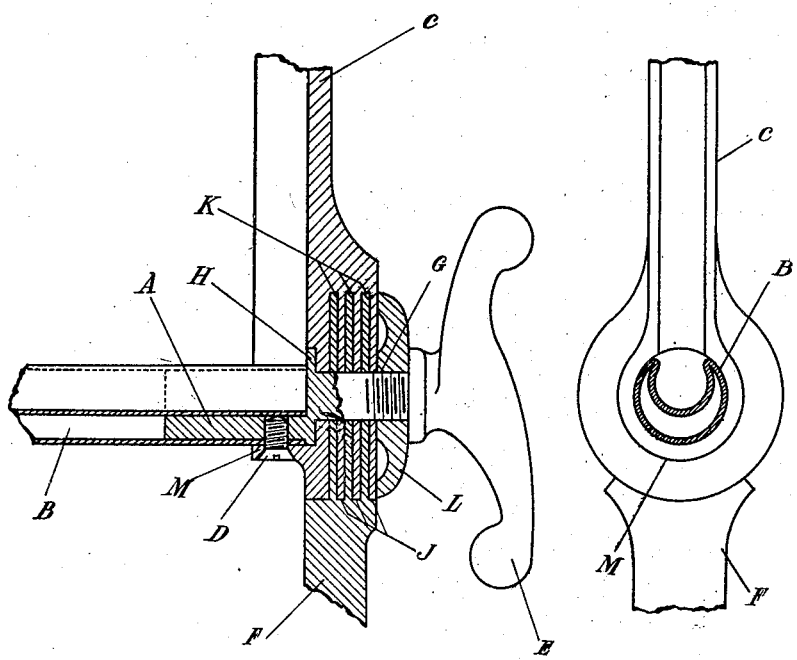

In the example of the invention illustrated in the drawings as left with the provisional specification Figure 1 is a sectional view of a wind screen hinge.

Fig. 2 an end view of the same.

Figure 4:
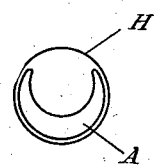

Fig. 3 is a sectional view of the said pin, and Fig. 4 an end view of the same.

In these drawings B is the lower member of the wind screen framework being crescent-shaped as shown in Fig. 2. A is a rod or hinge pin member having a crescent-shaped portion fitting tightly within the tube B. G is the round or hinge pin portion of the said rod having a screwed end fitted with a horned nut E. The central portion of the pin is formed with a flange H adapted to fit a countersunk recess in the frame member C. This frame member at the hinge end is forked in such a manner as to form a number of disk-like members J adapted to fit between a corresponding series of disk-like members K formed on the end of a hinged member F fixed rigidly to the vehicle in a suitable manner. A hole is bored through the center of each of these disk-like members to receive the hinge pin G, and L, is a washer arranged to distribute the pressure from the nut E over the said disk-like portions of the hinge. The tubular member B is secured to the rod A and to the frame member C by means of a screw D adapted to pass through an extension M formed on the frame member C and screwed into a hole tapped in the rod A.

A hinge of the kind shown is preferably provided at each end of the tubular member B, and it will be readily understood that by loosening the nuts E the frame can be moved into any desired angular position and then secured in such position by tightening the said nuts.

What I claim and desire to secure by Letters Patent is:—

A variable inclination wind screen for vehicles, having a framework of a screen grooved to receive the edges of a sheet of transparent medium and constructed of independent members, wherein the lower member of the framework is formed of a tube of crescent-shaped cross section, the inner curve of the crescent forming the groove for the lower edge of the sheet of transparent medium, and the ends of the tubes having tightly fitting therein rods of which the portions within the tubes are of the same section as the bore of the tube and the outer portions are of round section adapted to pass through holes formed in the sides of the framework so as to form the hinge about which the inclination of the screen can be varied, the said hinge being of the kind of which the engaging ends of the members fixed to the vehicle and those forming the side frame of the transparent medium are constructed as interfitting forks having prongs of disk shape perforated to receive the hinge pins and sufficiently thin that by means of nuts screwed to fit the projecting hinge pin ends of the said lower member of the frame they can be forced into frictional engagement so as to hold the frame securely in the desired angular position.

Dated this 3rd day of December, 1919.
In witness whereof I affix my signature.

GEORGE HARDIMAN RANSOM.